Nov. 20, 1934.   R. S. CARTER ET AL   1,981,644
BELT
Filed May 22, 1930
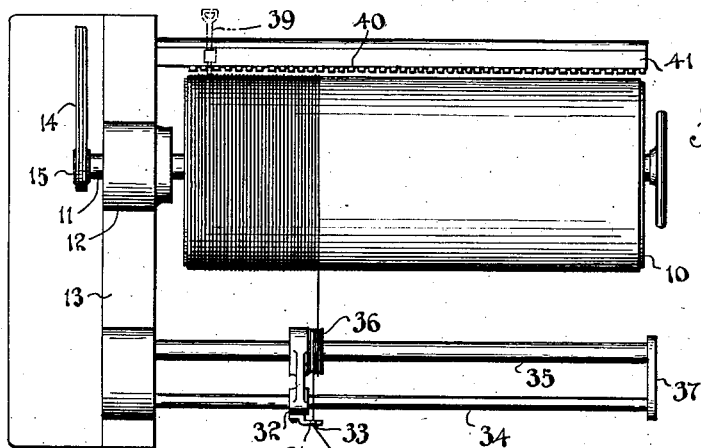
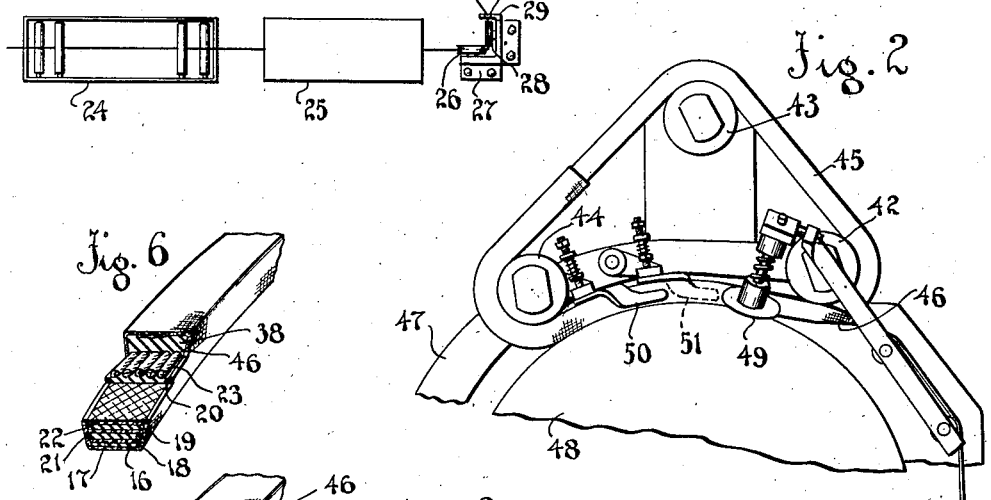
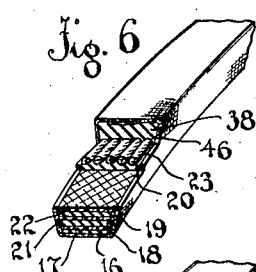
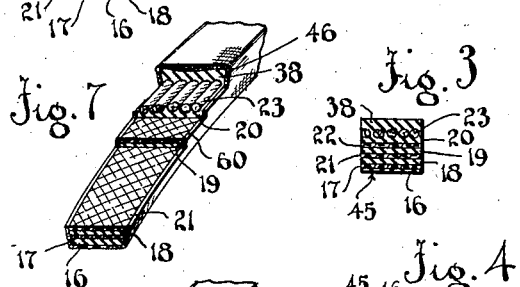
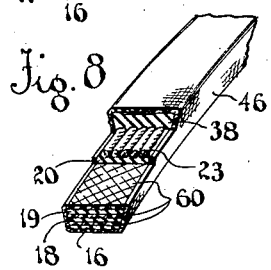
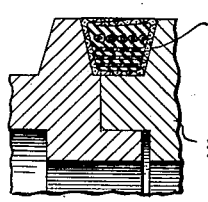
Inventor
Raymond S. Carter
& Harold G. Dick
Attorney Patented Nov. 20, 1934

1,981,644

UNITED STATES PATENT OFFICE 1,981,644

BELT

Raymond S. Carter and Harold G. Dick, Akron, Ohio, assignors, by mesne assignments, to Wingfoot Corporation, Wilmington, Del., a corporation of Delaware Application May 22, 1930, Serial No. 454,596

1 Claim. (Cl. 74—231)

This invention relates generally to endless rubber belts, and it has particular relation to a belt of the so-called V-type, and a method of making the same.

One object of the invention is to provide an endless belt having an endless tensile member that defines the neutral plane of the belt.

Another object of the invention is to provide an endless rubber belt wherein relatively open mesh or loosely arranged fabric is embodied in rubber in order to secure greater adhesion between the component parts of the belt.

At the present time V belts are employed as standard equipment in conjunction with motor vehicles, for driving fan belt pulleys. Since a fan belt pulley, and a pulley on the engine shaft about which the belt is trained ordinarily are small in diameter, the belt in moving around the pulleys is subject to considerable flexing. Particularly, the inner portion of the belt in moving about the pulleys is subjected to forces which tend to compress it, whereas the outer portion of the latter is subjected to forces which tend to elongate it. As a result, internal and opposing stresses are set up in the belt which tend to separate the component parts thereof and frequently early failure of the belt occurs because of such separation.

Heretofore, V-belts have been manufactured by winding strips of rubber and cord fabric about an annular support until a core of desired thickness was obtained and then covering the core with woven fabric. In such constructions, several layers of cord fabric were provided, either as a result of winding a single layer of cord fabric several times about the support, or else winding several layers of such fabric about the support and circumferentially spacing the laps of the respective layers. It was intended that the cord fabric should comprise the load transmitting portion of the belt. However, development work on belts of this character apparently indicates that all but the outer layer of cords absorb compressive stresses instead of tensile stresses, and that the outer layer carries practically the entire load. Hence, the outer layer of cords transmitted a load intended to be transmitted by all of the layers of cords, and consequently broke under the strain. Moreover, the inner layers of cords were not well adapted for absorbing compressive stresses, and separation of such layers, chafing of the cords in adjacent layers and deterioration of the belt by reason of excessive heat generated as a result of frictional engagement of component parts of the compression layer, caused early failure of the belt. Not all of the causes of the failure of such belts are known at present, and it is possible that the reasons for such failure may be changed by later discoveries. However, development work has satisfactorily established that the belt provided by this invention has increased the life thereof to a surprising degree.

This invention effectively obviates the disadvantages heretofore enumerated with respect to V belts, by providing tensile members in the belt at the neutral plane only, thereby avoiding the use of tensile members on the outer and inner sides of the neutral plane. Inwardly of the tensile member relatively soft and easily compressible material is provided, and the parts are so arranged, that considerable adhesion is secured between such material and the tensile member. Outwardly of the neutral plane, the belt comprises material which can be elongated or stretched easily. Practically no stresses are set up in the belt during its operation over small pulleys which tend to separate the inner and outer parts of the belt from the tensile member defining the neutral plane of the belt, because the material is well adapted to absorb the stresses on opposite sides of such plane.

The invention also contemplates the practice of a novel method of manufacturing belts which comprises winding flexible material such as rubber and woven fabric about a collapsible drum, and thereafter winding a cord helically about the latter. Then a thin layer of rubber is applied to the cord, the assembled band is cut into narrow annular cores, and each of the latter covered with woven fabric having its threads extending obliquely to the length of the belt. It is apparent that in each of the cores a single cord constituting in effect an endless tensile member comprises the load transmitting part of the belt and, consequently, laps in the load transmitting portion of the belt are avoided. Moreover, it is to be noted that the helical convolutions of cord coincide with the neutral plane of the belt.

For a better understanding of the invention, reference may now be had to the accompanying drawing, forming a part of this specification in which:

Fig. 1 is a plan view of an apparatus employed for assembling an annular band of belt material, and subsequently cutting it into narrow annular cores;

Fig. 2 is a fragmentary elevational view of a machine employed for applying a woven fabric cover to each of the belt cores manufactured by the apparatus shown by Fig. 1;

Fig. 3 is a cross-sectional view of one of the belt cores prior to the application of a woven fabric cover thereto;

Fig. 4 is a cross-sectional view of the core shown by Fig. 3 after it has been turned inside out and moved about the pulleys shown by Fig. 2;

Fig. 5 is a fragmentary cross-sectional view illustrating a mold for vulcanizing V belts;

Fig. 6 is a fragmentary view of a finished V belt, with parts broken away, illustrating the construction thereof; and Figs. 7 and 8 are views similar to Fig. 6, but pertaining to V belts of slightly different constructions.

Referring to Fig. 1, an apparatus for assembling strips of material into an annular band comprises a collapsible drum 10 supported on a shaft 11 which is journaled in a bearing 12 forming part of a frame 13. A driven chain 14 trained about a sprocket wheel 15 on the shaft 11 serves to rotate the drum 10. Initially, a layer of unvulcanized rubber 16 (shown by Fig. 3) is wound about the drum 10 and thereafter a layer of bias cut woven fabric 17 preferably rubberized, is wound about the rubber 16. In a similar manner other strips of rubber 18, 19 and 20 and strips of bias cut woven fabric 21 and 22 are alternately wound about the drum until a band of substantial thickness is built upon the latter. Consequently the band thus formed comprises strips of bias cut woven fabric separated by thin layers of rubber. It should be understood that instead of applying separate strips of fabric to the drum, a single strip can be wound about the drum until several convolutions have been built up. Also, the rubber may be applied to the fabric only before assembling the band upon the drum, thereby eliminating the winding of separate strips of rubber and fabric.

Following the application of the layers of fabric and rubber to the drum 10, a cord 23 is applied to the band of material thus assembled on the drum. Initially, the cord 23 is impregnated with rubber cement or the like by passing it through a vessel 24 containing such material in liquid form. Then the cord is conducted through a conventional drying apparatus 25 for the purpose of drying the cement prior to its application to the drum 10. It should be understood that the drying apparatus may be of any suitable construction and ordinarily it comprises a heated housing and means for causing a blast of air to be directed upon the cord as it passes through such housing. After the cord passes through the drying apparatus 25 it is conducted under a pulley 26 journaled in a standard 27 and then over a pulley 28 journaled in the standard and through an aperture 30 of an arm 29 secured to the standard adjacent the last mentioned pulley 28. Then the cord is directed through an aperture 33 of an arm 31 secured to a cross-head 32 which is slidably mounted upon guide rods 34 and 35 extending between the frame 13 and a standard 37. After passing through the aperture 33 the cord is directed about a pulley 36 on the cross-head 32 and then applied helically to the drum 10, by moving the cross-head 32 longitudinally of the guide rods 34 and 35 and simultaneously rotating the drum. Then a sheet of rubber 38 is wound over the convolutions of cord 23, which assists in retaining the cord in proper position. The annular band of rubber, woven fabric and cord now assembled, then is cut into a plurality of narrow annular cores 45 (Figs. 3 and 4) by means of a knife 39 adapted to be projected through slots 40 in a bar 41 projecting from one side of the frame 13 in parallel relation to the drum 10. Following the cutting of the band into narrow annular cores, the drum 10 is collapsed and the strips are removed from the latter.

A woven fabric envelope 46 then is applied to each of the cores 45 by means of an apparatus shown by Fig. 2. This apparatus is identical to that disclosed in the patent to Burkley et al., 1,747,856, and, consequently, need not be explained in detail. Essentially, it comprises a plurality of pulleys 42, 43 and 44 which are adapted to support each of the cores 45 during the application of a woven fabric cover thereto. Pulleys 42 and 44 are mounted upon a movable arm 47 in order that the core 45 may be positioned upon the pulley 43 and removed therefrom. A driven disc 48 contacts with that portion of the core extending between the pulleys 42 and 44 and serves to rotate the core and stitch the cover 46 to its outer peripheral surface. The cover 46 is directed between the disc 48 and core 45 and edge portions of the cover are stitched to the sides of the core by folding devices 49 disposed at opposite sides of the core. Then the edge portions of the cover 46 are folded about the inner peripheral surface of the core by means of folding devices 50 and 51.

If the layers of woven fabric 17, 21 and 22 and the rubber 16, 18, 19 and 20 are applied to the drum 10 prior to the cord 23, the core 45 may be turned inside out before the woven fabric cover 46 is applied thereto. This may be desirable because the core 45 in passing around the pulleys 42, 43 and 44 is subjected to forces which tend to widen the inner peripheral portion thereof and the covered core would have an inner peripheral surface wider than its outer peripheral surface. In the finished V belt it is the inner peripheral surface that is narrowest, and by turning the core inside out before applying the cover 46, the outer peripheral portion of the finished belt is the portion widened as shown by Fig. 4, by reason of contacting with the pulleys 42, 43 and 44. It should be understood that after the cover 46 is applied to the core 45, the assembly again is turned inside out or reverted to its original condition. When thus reverted to its original position, the outer peripheral surface of the core is widest as shown by Fig. 4 and, consequently, the core may be readily disposed in a V-shape groove 55 of a vulcanizing apparatus 56 shown by Fig. 5. It is evident that if the inner peripheral surface of the core were widest, the core could not readily be disposed properly in the groove 55 of the vulcanizing apparatus and probably some distortion of the core in a lateral direction would occur before it could be finally vulcanized to V-shape. A belt of the type described is shown in its finished form, by Fig. 6.

As an alternative method of manufacturing V-belts such as those described, the core shown by Fig. 3 in cross-section may be assembled upon the drum 10 in a reverse manner. That is, first the cord 23 and rubber normally on the outer surface of the core may be wound about the drum 10 and then the several layers of fabric and rubber may be wound about the cord. Cores manufactured from a band of material thus assembled need not be turned inside out before the cover is applied, but it is necessary to turn the core inside out after the cover is applied, in order that the component parts of the finished belt will be disposed in their operative positions.

The construction of V belts shown by Fig. 7 is slightly different from that shown by Fig. 6, in that a layer of fabric 60 is disposed adjacent and inward of the cord 23 and comprises loosely woven threads extending preferably obliquely to the length of the belt. This construction lends an advantage to the belt because rubber can be easily forced through the interstices of the fabric and thereby better adhesion may be secured between the cords and the other layers of fabric. Moreover, the loosely woven fabric 60 does not materially weaken the connection of rubber between the cords 23 and fabric 21, although it does provide a base which maintains the cords aligned transversely of the belt.

The construction shown by Fig. 8 is similar to that shown by Fig. 6, but instead of using closely woven fabric as shown in the latter figure, the fabric employed is the same as that utilized in the construction shown by Fig. 7 and indicated at 60. It will be noted that the inner portion of the belt shown by Fig. 8 practically constitutes a body of rubber because the interstices in the fabric are very large. Hence, the probability of separation of component parts of the inner portion of the belt is practically obviated, while at the same time a very secure adhesion is provided between the cord and the inner portion of the belt. Moreover, the inner portion of the belt shown by Fig. 8 is relatively soft and flexible, which obviates hard or rigid corners at the sides of the inner peripheral surface of the belt and thereby prevents to a great degree, breaking of the cover of the belt at such corners.

In all of the constructions illustrated, it will be noted that an endless cord 23 constitutes the load transmitting part of the belt, and that there are no laps in such part of the belt that may become separated. Furthermore, the convolutions of the cord are disposed in a plane parallel to the axis about which the belt operates. In such constructions, the convolutions of the cord define the neutral plane of the belt and since such convolutions are all located in such plane, separation of parts of the tensile layer by reason of differences in stresses at opposite sides of the neutral plane is prevented. Manifestly, if the layer of cords is provided with rubber at opposite sides thereof, such rubber will naturally withstand tensile and compressive stresses, and it will not separate from the cords because immediately adjacent the latter the stresses are practically negligible. In the constructions illustrated particularly by Fig. 8, the possibility of internal stresses in the belt separating any portions thereof is practically obviated, because the layer of cords is at the neutral plane, and the material on opposite sides of the cords in effect operate similarly to elastic rubber even though fabric comprises a part thereof, because such fabric is loosely woven and the rubber projects through the interstices thereof.

Actual operation of V belts such as provided by this invention indicates that the life of the belt is increased to a marked degree. Experiments have determined that belts constructed according to prior practices have a life approximately one-third as long as that of belts constructed according to this invention. A primary reason for this increase in the life of V belts resides in locating the tensile members only at the neutral plane of the belt instead of providing tensile members on one side of the neutral plane which would be subjected to compressive stresses. Moreover, on opposite sides of the neutral plane, a practically integral rubber construction is provided, even though fabric is employed, which prolongs the life of the belt because rubber is particularly adapted to withstand the stresses set up in the belt. While a single layer of tensile cords is preferred, it is to be understood that conditions may warrant the employment of more than a single layer of helically arranged tensile cords and that such variations in construction are within the contemplation of the invention.

Although only the preferred forms of the invention have been shown and described in detail, it will be apparent to those skilled in the art that the invention is not so limited but that various modifications may be made therein without departing from the spirit of the invention or from the scope of the appended claim.

What we claim is:

A V-belt comprising an endless band of rubber of substantially V-shaped cross-section, a load-bearing layer composed of a plurality of turns of a single helically-wound textile cord embedded in substantially the neutral axis of the band, and a layer of open-mesh bias-cut fabric also embedded in the rubber inwardly of said layer of cord and separated therefrom by portions of the rubber, said open-mesh fabric serving to maintain the successive turns of cord in a single plane yet leaving the entire body freely flexible.

RAYMOND S. CARTER.
HAROLD G. DICK.